United States Patent
Kumar (10) Patent No.: US 8,345,860 B1
(45) Date of Patent: Jan. 1, 2013

(54) METHOD AND SYSTEM FOR DETECTION OF ONSET OF NEAR-END SIGNAL IN AN ECHO CANCELLATION SYSTEM

(75) Inventor: M. Senthil Kumar, Hyderabad (IN)

(73) Assignee: Hellosoft India Pvt. Ltd, Andhra Pradesh (IN)

( * ) Notice: Subject to any disclaimer, the term of this patent is extended or adjusted under 35 U.S.C. 154(b) by 1272 days.

(21) Appl. No.: 12/151,928

(22) Filed: May 9, 2008

(51) Int. Cl.
*H04M 9/08* (2006.01)
(52) U.S. Cl. .................................. 379/406.08
(58) Field of Classification Search .............. 379/406.08
See application file for complete search history.

(56) References Cited

U.S. PATENT DOCUMENTS

2002/0075856 A1* 6/2002 LeBlanc ........................ 370/352

OTHER PUBLICATIONS

A double-talk detector for acoustic echo cancellation applications; Kaushik Ghose, V. Umapathi Reddy; Signal Processing, vol. 80, Issue 8 (Aug. 2000); pp. 1459-1467; Year of Publication: 2000; Elsevier North-Holland, Inc. Amsterdam, The Netherlands, The Netherlands.

\* cited by examiner

*Primary Examiner* — Alexander Jamal
(74) *Attorney, Agent, or Firm* — William L. Botjer (57) ABSTRACT

A method, a system and a computer program product for fast detection of the onset of a near-end signal is provided. An Acoustic Echo Canceller (AEC) attenuates an acoustic echo present in a tele-communication network. The AEC includes an adaptive filter that estimates the acoustic echo and generates an error signal. The error signal is the difference between the acoustic echo and the estimate of acoustic echo plus a near-end signal, if present. The method comprises computing an onset indicator parameter from the error signal and the estimate of acoustic echo. Several other parameters are subsequently calculated by using the onset indicator parameter, the error signal and the estimate of acoustic echo. The presence of the near-end signal is detected with very low detection delay by using the parameters mentioned above and one or more threshold values.

22 Claims, 9 Drawing Sheets

Plot (a): Far-end signal

Plot (b): Acoustic echo

Fig.6A

Plot (c): Near-end signal

Plot (d): Near-end signal detection
(——— Present invention, − − − − Angle Based Method)

METHOD AND SYSTEM FOR DETECTION OF ONSET OF NEAR-END SIGNAL IN AN ECHO CANCELLATION SYSTEM

BACKGROUND

The present invention relates generally to the field of digital signal processing. More specifically, the present invention relates to a method, a system and a computer program product for detecting the onset of a near-end signal in an Acoustic Echo Canceller (AEC).

In a tele-communication network, various types of communication equipment enable two or more users to have a conversation with each other. To enhance their comfort during the conversation, users prefer hands-free communication equipment. In a typical hands-free communication apparatus, users do not need to use their hands to hold communication equipment during a conversation. For example, while driving a car, users can operate car phones via their voice commands, thereby avoiding the use of their hands. Examples of hands-free communication equipment include, but are not limited to, loudspeaker and microphone communication, teleconferencing and desktop communication.

In a typical conversation between two users, one user can be referred to as a near-end user. From the perspective of the near-end user, the other user can be referred to as a far-end user. The near-end user can use a hands-free communication apparatus to communicate with the far-end user. Hands-free communication equipment include a microphone and a loudspeaker. The microphone is used to input the speech signal generated by the near-end user. The speech signal at the input of the microphone is referred to as a near-end signal. The loudspeaker is used to output the speech signal generated by the far-end user. The electrical speech signal at the input of the loudspeaker is referred to as a far-end signal.

It is possible that the received far-end signal is reflected by the surroundings of the hands-free communication apparatus. The reflection of the far-end signal results in the formation of an acoustic echo, which is a scattered and delayed replica of the far-end signal. When the microphone is placed near the loudspeaker, the microphone may capture the acoustic echo. As a result, the far-end user may receive the acoustic echo. Moreover, if the near-end signal is present, the far-end user receives the near-end signal with the acoustic echo. In both the cases, the acoustic echo reduces the clarity of the conversation, which may be disrupted.

Various techniques have been used to attenuate the acoustic echo. One such technique uses an Acoustic Echo Canceller (AEC) to attenuate the acoustic echo. The AEC includes an adaptive filter, a Near-end Signal Detector (NSD) and a Non-Linear Processor (NLP). The AEC may also include a Comfort Noise Generator (CNG). The adaptive filter estimates the acoustic echo and subtracts the estimate of acoustic echo from the acoustic echo. This subtraction results in a residual echo. The estimate of acoustic echo depends on the coefficients of the adaptive filter, which are updated based on the output of the microphone.

When the coefficients of the adaptive filter are updated in the absence of the near-end signal at the output of the microphone, the value of the estimate of acoustic echo is close to that of the acoustic echo. Therefore, the value of the residual echo is close to zero and echo cancellation takes place. In the absence of the near-end signal, the residual echo is suppressed by the NLP, which is a switched attenuator. The NLP replaces the residual echo with a comfort noise that is generated by the CNG. Thereafter, the comfort noise is passed to the far-end user and the residual echo is suppressed.

However, if the coefficients of the adaptive filter are updated in the presence of the near-end signal at the output of the microphone, the coefficients of the adaptive filter diverge. This divergence is caused by the fact that unlike the acoustic echo, the near-end signal does not correlate with the far-end signal. Therefore, the near-end signal acts like a burst noise for the adaptive filter and forces the coefficients of the adaptive filter to diverge from their converged values. The divergence of the adaptive filter results in poor echo cancellation. To prevent this divergence, the adaptive filter should not be updated for the duration of the near-end signal. The duration of the near-end signal is defined by its onset and termination. In the AEC, the NSD is used to detect the onset and termination of the near-end signal.

Several techniques have been proposed to detect the onset of the near-end signal. One such technique is known as Angle Based Method (ABM). The ABM detects the onset of the near-end signal on the basis of the angle between the output signal of the microphone and the estimate of acoustic echo. However, the ABM introduces a delay in the detection of the onset of the near-end signal. This delay causes the adaptive filter to diverge. As a result, the process of echo cancellation is ineffective and the conversation may be unclear.

Therefore, there is a need for a system and a method that reduces the delay in the detection of the onset of the near-end signal. Further, the method and the system should improve the overall clarity of the conversation.

SUMMARY

An object of the present invention is to provide a method and a system for fast detection of the onset of a near-end signal at the output of a microphone.

Another object of the present invention is to provide a method and a system for the detection of the onset of the near-end signal with better Echo Return Loss Enhancement (ERLE) performance than that of the Angle Based Method (ABM).

Yet another object of the present invention is to provide a method and a system for the detection of the onset of the near-end signal with an enhanced performance and complexity that is only marginally higher than that in the ABM.

Various embodiments of the present invention provide a method, a system and a computer program product for fast detection of the onset of a near-end signal at the output of the microphone. An Acoustic Echo Canceller (AEC) facilitates detection of the onset of the near-end signal to effectively attenuate the acoustic echo during a conversation between a far-end user and a near-end user. The AEC includes an adaptive filter that generates an estimate of the acoustic echo corresponding to a far-end signal. Further, an error signal is generated by using the near-end signal and the estimate of acoustic echo. The error signal and the estimate of acoustic echo are used to calculate an onset indicator parameter, whose high value indicates the onset of the near-end signal. The onset indicator parameter is used to calculate an average onset indicator parameter and an onset detection threshold parameter. The average onset indicator parameter is the average value of the onset indicator parameter. Further, the onset detection threshold parameter is an adaptive threshold that is used to detect the onset of the near-end signal. In addition to these parameters, the cosine value of an angle between the microphone output signal and the estimate of acoustic echo is calculated. All the parameters given above are collectively used with one or more threshold values for fast detection of the onset of the near-end signal.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF VARIOUS EMBODIMENTS

Various embodiments of the present invention provide a method, a system and a computer program product for fast detection of the onset of a near-end signal in a tele-communication network. The tele-communication network includes a near end and a far end. The near and far ends have users who can carry out a conversation with each other. The speech signal of a user at the far end, hereinafter referred to as a far-end user, is referred to as a far-end signal. The speech signal of a user at the near end, hereinafter referred to as a near-end user, is referred to as a near-end signal. In accordance with the present invention, the near end receives the far-end signal from the far end and user sends the near-end signal to the far end. Near-end and far-end users may use hands-free communication equipment to facilitate the exchange of near-end and far-end signals. A typical hands-free communication apparatus present at the near end includes a microphone and a loudspeaker. The microphone captures the near-end signal for transmission to the far end. Further, the loudspeaker outputs the far-end signal such that the near-end user is able to hear it. The far-end signal from the loudspeaker may be reflected and scattered by the surroundings of the near end. The resulting signal is known as an acoustic echo.

Since the microphone is present at the near end, it may capture the acoustic echo in addition to the near-end signal, as described before. As a result, the acoustic echo and the near-end signal are both sent to the far end. The acoustic echo disturbs the conversation between the near end and the far end users. The acoustic echo is attenuated by an Acoustic Echo Canceller (AEC). An AEC includes an adaptive filter and a Near-end Signal Detector (NSD). The adaptive filter is used to estimate the acoustic echo. The estimate of acoustic echo is subsequently subtracted from the acoustic echo. As a result, the acoustic echo is attenuated. Further, the estimation made by the adaptive filter requires detection of the onset of the near-end signal. This detection is performed by the NSD. The attenuation of the acoustic echo depends on how quickly the near-end signal is detected. The present invention relates to a method and a system for fast detection of the onset of the near-end signal.

Figure 1:
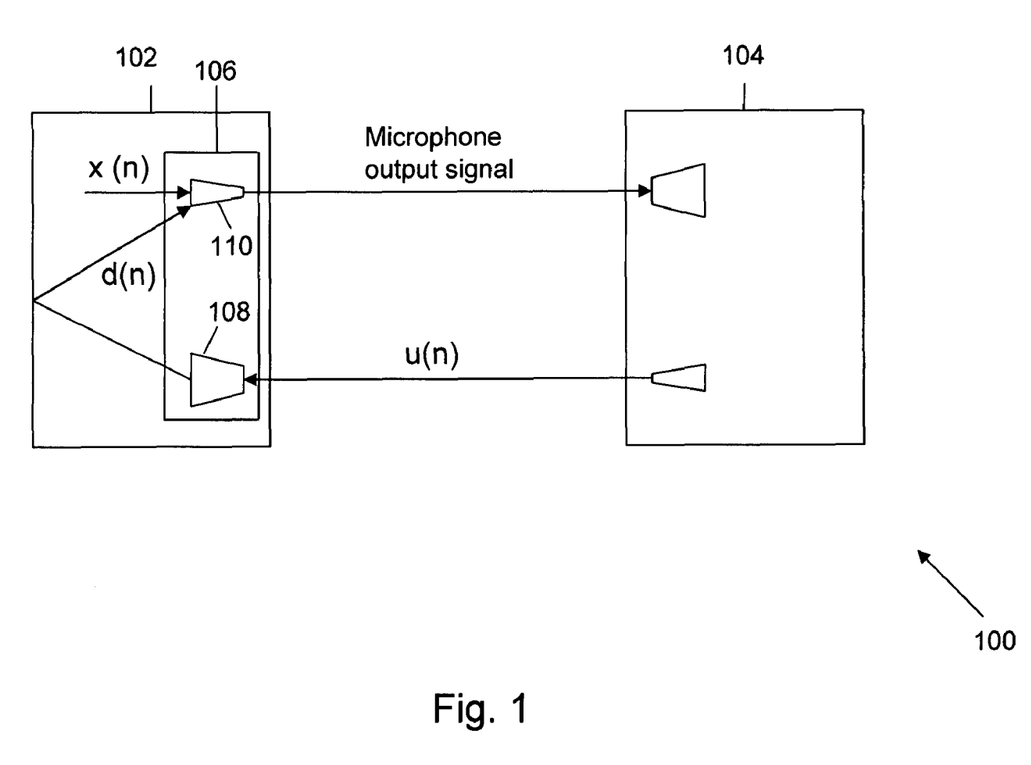
FIG. 1 illustrates an exemplary environment, wherein various embodiments of the present invention can be practiced.

FIG. 1 illustrates an environment 100 wherein various embodiments of the present invention may be practiced. Environment 100 is a tele-communication network where one or more users can communicate with each other from their respective locations. Examples of tele-communication networks include, but are not limited to, the Internet and telephone networks. Environment 100, illustrated in FIG. 1, typically shows two locations—a near end 102 and a far end 104. Users at these two locations can carry out a conversation with each other by exchanging speech signals by using their communication equipments. A user at near end 102 is hereinafter referred to as a near-end user. Further, from the perspective of the near-end user, a user at far end 104 is hereinafter referred to as a far-end user.

The near-end user can use a communication apparatus such as a hands-free communication apparatus 106 to exchange speech signals with the far-end user. Examples of hands-free communication apparatus 106 include a car phone, a teleconferencing apparatus and a desktop communication apparatus. Hands-free communication apparatus 106 includes a loudspeaker 108 and a microphone 110.

Microphone 110 captures the speech signals of the near-end user and loudspeaker 108 outputs the speech signal of the far-end user. The speech signal of the near-end user is hereinafter referred to as a near-end signal and is denoted by $x(n)$ where n is the time instant. In accordance with an embodiment of the present invention, near end 102 sends the near-end signal $x(n)$ to far end 104 via microphone 110. Further, near end 102 receives a far-end signal from far end 104 via loudspeaker 108. The far-end signal is the speech signal of the far-end user and is denoted by $u(n)$ at time instant n.

When the far-end signal $u(n)$ from loudspeaker 108 is reflected by the surroundings of near end 102, a reflected signal, known as an acoustic echo, is generated. The acoustic echo, denoted by $d(n)$ at time instant n, gets added to the near-end signal $x(n)$ at the input of microphone 110. As a result, microphone 110 captures the acoustic echo $d(n)$ along with the near-end signal $x(n)$. The sum of all the signals at the output of microphone 110 is referred to as a microphone output signal. Therefore, the microphone output signal at time instant n can be denoted by $\{d(n)+x(n)\}$. In accordance with an embodiment of the present invention, the microphone output signal may include system noise with the acoustic echo $d(n)$ and the near-end signal $x(n)$. The system noise is negligible, as compared to the acoustic echo and the near-end signal, and can be ignored. The acoustic echo $d(n)$ disturbs the conversation between the near-end user and the far-end user and can be attenuated by using an Acoustic Echo Canceller (AEC).

Figure 2:
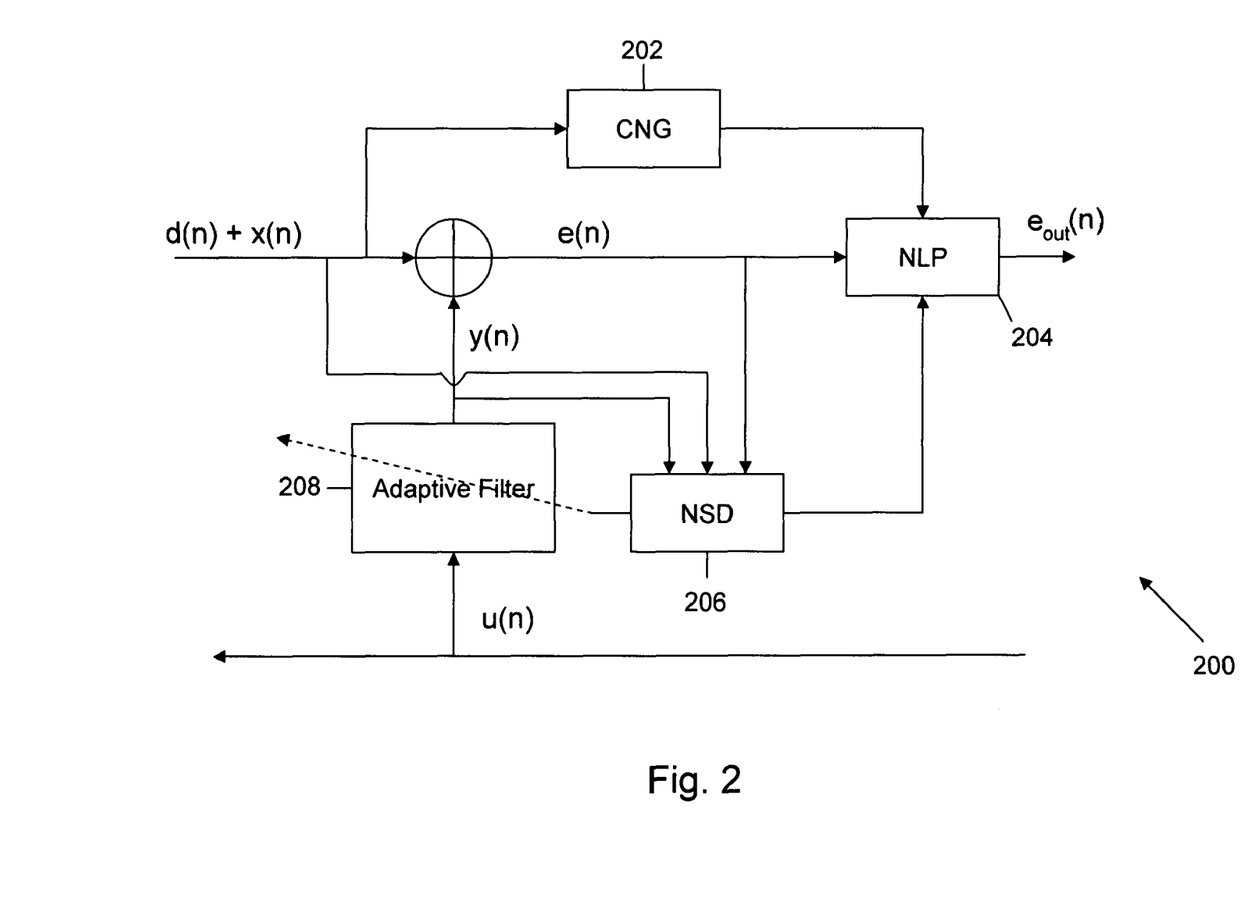
FIG. 2 illustrates an Acoustic Echo Canceller (AEC) for attenuating the acoustic echo, in accordance with various embodiments of the present invention.

FIG. 2 illustrates various elements of an Acoustic Echo Canceller (AEC) 200 that is used to attenuate the acoustic echo $d(n)$, in accordance with various embodiments of the present invention. AEC 200 includes a Comfort Noise Generator (CNG) 202, a Non Linear Processor (NLP) 204, a Near-end Signal Detector (NSD) 206 and an adaptive filter 208. In one embodiment of the present invention, adaptive filter 208 can be a Normalized Least Mean Square (NLMS) filter with 256 taps. Each tap of adaptive filter 208 can be represented by a coefficient. Further, NLP 204 is a switched attenuator that is used to generate the output $e_{out}(n)$ of AEC 200. NLP 204 suppresses the residual echo in the absence of the near-end signal $x(n)$. In addition, CNG 202 generates a comfort noise at the output $e_{out}(n)$ for transmission to the far end in place of the residual echo.

Adaptive filter 208 uses the far-end signal $u(n)$ to generate an estimate of the acoustic echo, which is denoted by $y(n)$ at time instant n. The estimate of acoustic echo, $y(n)$, depends on the coefficients of adaptive filter 208 and is subtracted from the microphone output signal $\{d(n)+x(n)\}$, to yield an error signal. The error signal is denoted by $e(n)$ at time instant n, and the mathematical expression for $e(n)$ is $e(n)=x(n)+d(n)-y(n)$. The difference between the acoustic echo $d(n)$ and the estimate of acoustic echo, $y(n)$, is $\{d(n)-y(n)\}$ and is hereinafter referred to as residual echo. Hence, the error signal can be expressed as the sum of the near-end signal and the residual echo.

The coefficients of adaptive filter 208 are updated at regular time intervals to calculate the estimate of acoustic echo, $y(n)$, effectively. When the coefficients are updated in the absence of the near-end signal $x(n)$, the value of the estimate of acoustic echo, $y(n)$, is close to that of the acoustic echo $d(n)$, and the value of the residual echo $\{d(n)-y(n)\}$ is nearly zero. Further, the error signal $e(n)$ contains only the residual echo, whose value is close to zero. In this case, NLP 204 passes a comfort noise at the output of AEC 200 and suppresses the residual echo. As a result, the output signal $e_{out}(n)$ at NLP 204 only includes comfort noise in the absence of a near-end signal.

When the coefficients of adaptive filter 208 are updated in the presence of the near-end signal $x(n)$, the coefficients of adaptive filter 208 diverge, and the estimate of acoustic echo, $y(n)$, differs significantly from the acoustic echo $d(n)$. As a result, the residual echo and the error signal $e(n)$ increase. Therefore, to prevent the coefficients from diverging in the presence of the near-end signal $x(n)$, the coefficients are frozen for that duration. In other words, adaptive filter 208 is disabled at the onset of the near-end signal $x(n)$. Further, adaptive filter 208 is kept in a disabled state until the near-end signal $x(n)$ is present at the output of microphone 110. Furthermore, adaptive filter 208 is enabled at the termination of the near-end signal $x(n)$. NSD 206 quickly detects the onset of the near-end signal $x(n)$ to disable adaptive filter 208.

NSD 206 uses the microphone output signal $\{d(n)+x(n)\}$, the estimate of acoustic echo, $y(n)$, and the error signal $e(n)$ for fast detection of the onset of the near-end signal $x(n)$. Further, NSD 206 generates a control signal that indicates the presence/absence of the near-end signal $x(n)$. In the absence of the near-end signal $x(n)$, NSD 206 outputs the error signal $e(n)$, which acts like a control signal for updating the coefficients of the adaptive filter. The dotted line across adaptive filter 208 in FIG. 2 represents the control signal from NSD 206 that is used to disable adaptive filter 208 in the presence of the near-end signal $x(n)$, or to update the coefficients of adaptive filter 208 in the absence of the near-end signal $x(n)$. The control signal is also fed to NLP 204. The output $e_{out}(n)$ at NLP 204 is either the error signal $e(n)$ or the comfort noise, based on the control signal. When the control signal indicates the presence of the near-end signal $x(n)$, output $e_{out}(n)$ is the error signal $e(n)$. When the control signal indicates the absence of the near-end signal, output $e_{out}(n)$ is the comfort noise. The method for fast detection of the onset of the near-end signal $x(n)$, to quickly disable/enable adaptive filter 208, has been illustrated with reference to FIG. 3.

Figure 3:
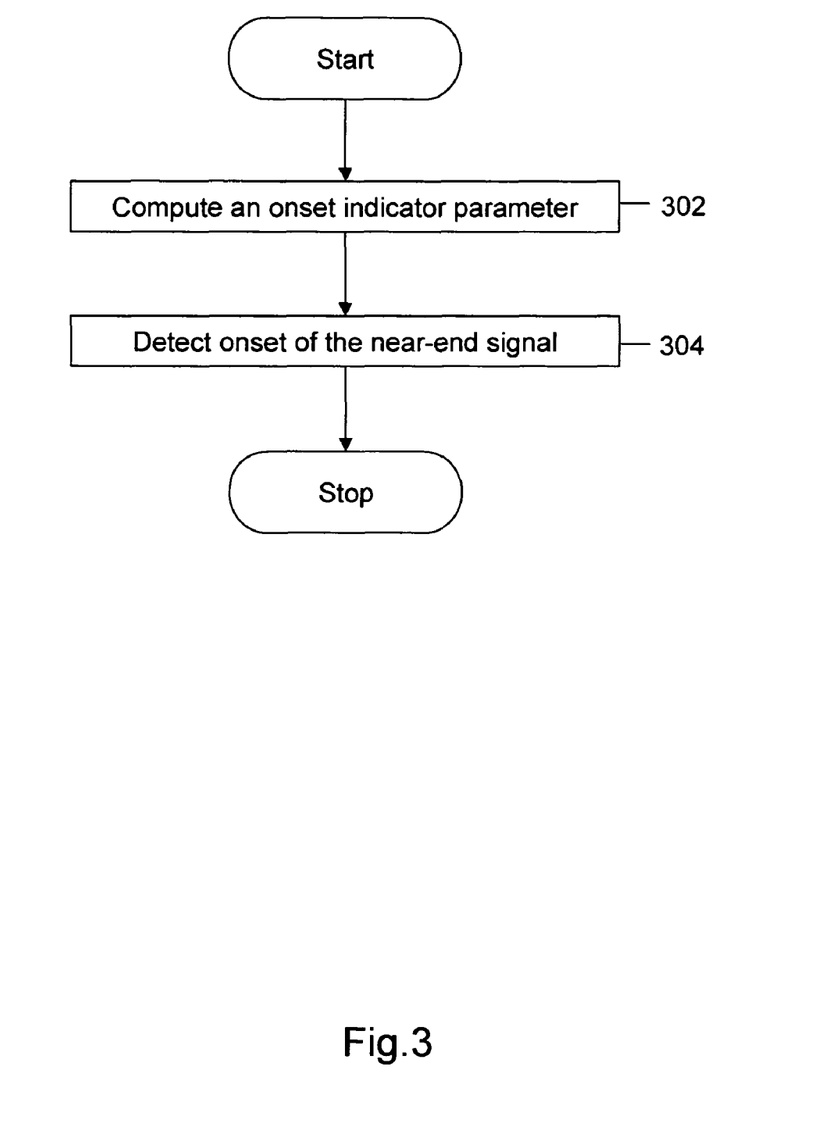
FIG. 3 is a flowchart illustrating a method for fast detection of the onset of the near-end signal, in accordance with various embodiments of the present invention.

FIG. 3 is a flowchart illustrating a method for fast detection of the onset of the near-end signal $x(n)$ at NSD 206, in accordance with various embodiments of the present invention. At step 302, an onset indicator parameter, denoted by $\Delta(n)$ at time instant n, is computed from the error signal $e(n)$ and the estimate of acoustic echo, $y(n)$. The onset indicator parameter $\Delta(n)$ is a parameter whose high value indicates the onset of the near-end signal $x(n)$. Computation of the onset indicator parameter $\Delta(n)$ includes initializing a first set of parameters and calculating a second set of parameters. Details pertaining to the first and second set of parameters are explained in conjunction with FIG. 4. Further, at step 304, the onset of the near-end signal $x(n)$ is detected on the basis of at least one of: i) a cosine value of an angle between the microphone output signal $\{d(n)+x(n)\}$ and the estimate of acoustic echo, $y(n)$, ii) the onset indicator parameter $\Delta(n)$, an average onset indicator parameter, and an onset detection threshold parameter. The mathematical relationships between the parameters given above have been explained in detail in conjunction with FIG. 4.

FIG. 4 is a flowchart illustrating a detailed method for fast detection of the onset of the near-end signal $x(n)$ at NSD 206 during a conversation between the near-end user and the far-end user, in accordance with various embodiments of the present invention. The time instant n is initialized to 0, one second after the start of the conversation. This delay of one second is provided for convergence of the coefficients of adaptive filter 208. At step 402, the first set of parameters are initialized at n=0. The first set of parameters include an average error signal, denoted by $e_{avg}(n)$; the average onset indicator parameter, denoted by $\Delta_{avg}(n)$; and the onset detection threshold parameter, denoted by $\Delta_{st}(n)$. The average error signal $e_{avg}(n)$ and the average onset indicator parameter $\Delta_{avg}(n)$ are the average values of the error signal $e(n)$ and the onset indicator parameter $\Delta(n)$, respectively, at time instant n. Further, the onset detection threshold parameter $\Delta_{st}(n)$ is an adaptive threshold for detecting the onset of the near-end signal $x(n)$ at time instant n. In accordance with an embodiment of the present invention, the initialized values of the first parameters at n=0 are $e_{avg}(0)=0.0001$, $\Delta_{avg}(0)=0.0001$ and $\Delta_{st}(0)=0.0001$.

At step 404, the time instant n is incremented by one, i.e., n is set as n+1. For example, when n=0 at step 402, n=1 at step 404. Further, a second set of parameters are calculated at time instant n, where n>0. The second set of parameters includes the average error signal $e_{avg}(n)$, the average onset indicator parameter $\Delta_{avg}(n)$, and the onset indicator parameter $\Delta(n)$, as well as the cosine value of the angle between the microphone output signal $\{d(n)+x(n)\}$ and the estimate of acoustic echo, $y(n)$. The cosine value is hereinafter referred to as $C(n)$. The mathematical formula for $C(n)$ is explained below in this application. Furthermore, a near-end indicator $I(n)$ is set to 0. The near-end indicator $I(n)$ is used to indicate the presence of the near-end signal $x(n)$. As soon as the onset of the near-end signal $x(n)$ is detected at time instant n, the value of the near-end indicator $I(n)$ is set to one.

In accordance with an embodiment of the present invention, the average error signal $e_{avg}(n)$ is calculated from the error signal $e(n)$ by using the relation $e_{avg}(n)=e_{avg}(n-1)+0.001(abs(e(n))-e_{avg}(n-1))$, where abs denotes the absolute value function. The $e_{avg}(n-1)$ is the average value of the error signal at time instant n−1. For example, when n=1, n−1=0. Accordingly, $e_{avg}(1)$ can be calculated by using $e_{avg}(0)$. Further, $e_{avg}(1)$ is used to calculate $e_{avg}(2)$ when n=2. The average error signal $e_{avg}(n)$ is subsequently used to calculate the onset indicator parameter $\Delta(n)$.

The average error signal $e_{avg}(n)$, the error signal $e(n)$, and the estimate of acoustic echo, $y(n)$, are used to calculate the onset indicator parameter $\Delta(n)$ at time instant n. In accordance with an embodiment of the present invention, the mathematical formula for the calculation of the onset indicator parameter is $\Delta(n)=e^2(n)/(e_{avg}(n)\cdot y(n))$. Since error signal $e(n)$ is high at the onset of the near-end signal $x(n)$, and average error signal $e_{avg}(n)$ and estimate of the acoustic echo, $y(n)$ do not increase instantaneously, the value of the onset indicator parameter $\Delta(n)$ is also high at the onset of the near-end signal $x(n)$. This is indicated by the formula for the calculation of $\Delta(n)$. Further, the value of the onset indicator parameter $\Delta(n)$ decreases slowly with time until the termination of the near-end signal $x(n)$.

The onset indicator parameter $\Delta(n)$ facilitates the detection of the onset of the near-end signal $x(n)$. However, the value of the onset indicator parameter $\Delta(n)$ fluctuates. Therefore, at times, there is a possibility of a false indication of the onset of the near-end signal $x(n)$. To eliminate the chances of the false indication, the onset indicator parameter $\Delta(n)$ is used to calculate the average onset indicator parameter $\Delta_{avg}(n)$. The value of the average onset indicator parameter $\Delta_{avg}(n)$ does not fluctuates as rapidly as the value of the onset indicator parameter $\Delta(n)$. Therefore, the average onset indicator parameter $\Delta_{avg}(n)$ is used to detect the onset of the near-end signal $x(n)$. In accordance with an embodiment of the present invention, the average onset indicator parameter $\Delta_{avg}(n)$ at time instant n is calculated by using the formula $\Delta_{avg}(n)=\Delta_{avg}(n-1)+0.005(\Delta(n)-\Delta_{avg}(n-1))$ when $\Delta(n)<\Delta_{avg}(n-1)$. $\Delta_{avg}(n)$ and $\Delta_{avg}(n-1)$ are average onset indicator parameters at time instants n and n−1, respectively. Further, the average onset indicator parameter $\Delta_{avg}(n)$ at time instant n is calculated by using the formula $\Delta_{avg}(n)=\Delta_{avg}(n-1)+0.4(\Delta(n)-\Delta_{avg}(n-1))$ when $\Delta(n) \Delta_{avg}(n-1)$.

As mentioned earlier, the cosine value $C(n)$ of the angle between the microphone output signal $\{d(n)+x(n)\}$ and the estimate of acoustic echo, $y(n)$, is calculated to facilitate the detection of the onset of the near-end signal $x(n)$. In accordance with an embodiment of the present invention, the $C(n)$ is calculated by using the mathematical relationship, $$C(n) = \frac{\sum_{k=0}^{N-1}(d(n-k)+x(n-k))y(n-k)}{\sqrt{\sum_{k=0}^{N-1}(d(n-k)+x(n-k))^2}\sqrt{\sum_{k=0}^{N-1}y^2(n-k)}}$$

where N denotes the number of samples of the microphone output signal $\{d(n)+x(n)\}$ and the estimate of acoustic echo, $y(n)$, which is used to calculate the $C(n)$. The total number of samples used for the calculation of $C(n)$ is hereinafter referred to as the window length. In the absence of the near-end signal $x(n)$, $C(n)$ is close to 1 because the value of the microphone output signal $\{d(n)+x(n)\}$ is close to that of the estimate of acoustic echo, $y(n)$. On the other hand, $C(n)$ is significantly far from 1 if the near-end signal is present. Therefore, the deviation of $C(n)$ from 1 can be used as an indication of the presence of the near-end signal $x(n)$.

Figure 4A:
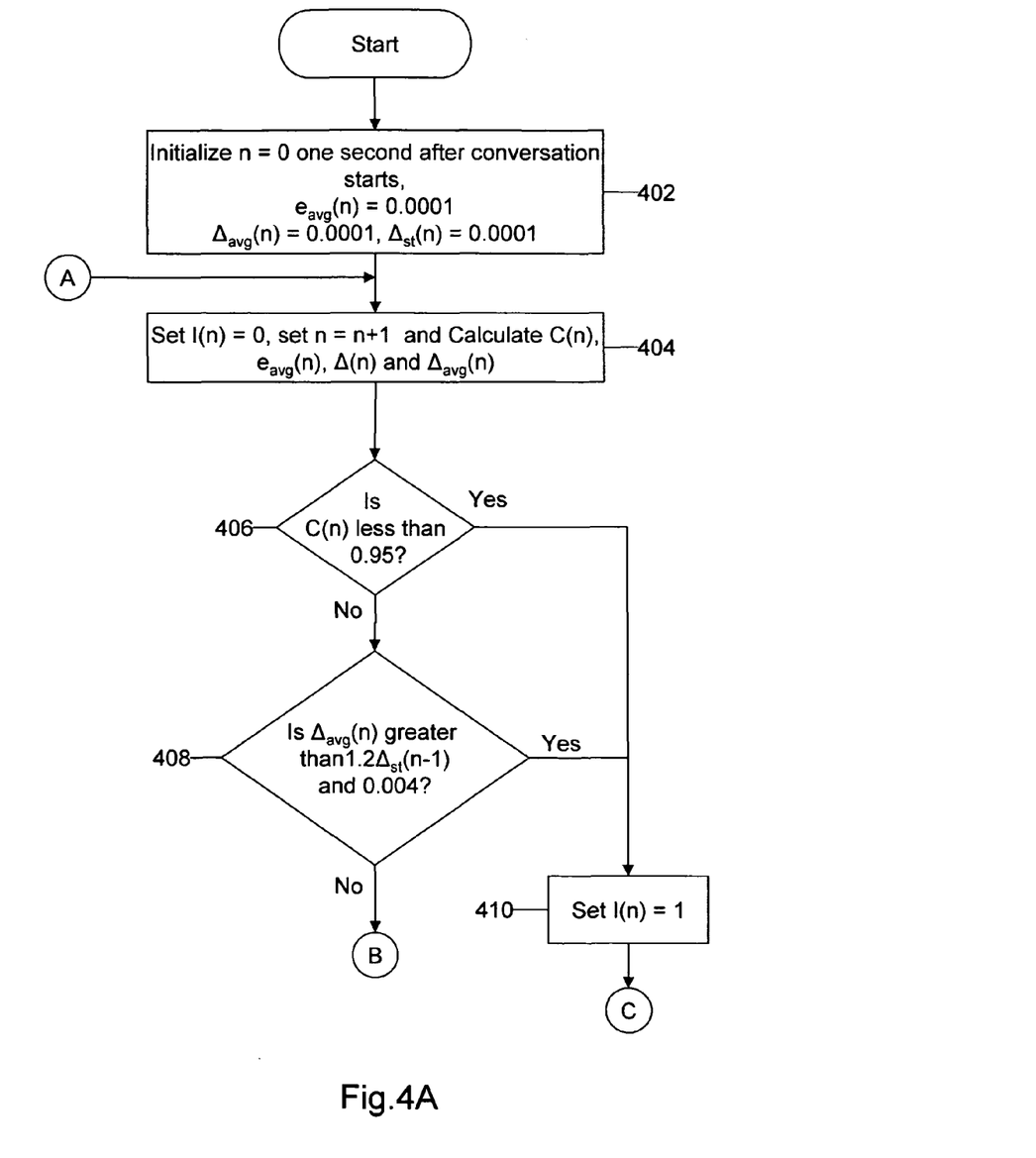
FIGS. 4A and 4B comprise a flowchart illustrating in detail a method for fast detection of the onset of the near-end signal, in accordance with various embodiments of the present invention.

At step 406, $C(n)$ is compared with a first threshold value. In accordance with an embodiment of the present invention, the threshold value is chosen as 0.95. As mentioned above, if $C(n)$ is significantly away from 1, the possibility of the presence of the near-end signal $x(n)$ is higher. Therefore, as soon as $C(n)$ becomes less than 0.95, the onset of the near-end signal $x(n)$ is assumed to have been detected. When the onset of the near-end signal $x(n)$ is detected at time instant n, the value of the near-end indicator $I(n)$ is set as 1 at step 410. As mentioned at step 404, the value of the near-end indicator $I(n)$, 1, indicates the presence of the near-end signal $x(n)$. Further, at step 410, the coefficients of adaptive filter 208 are frozen to prevent their divergence during the presence of the near-end signal $x(n)$. Furthermore, NLP 204 is switched OFF to pass the error signal $e(n)$ at the output of AEC 200, since the error signal $e(n)$ includes the near-end signal $x(n)$.

It may be possible that the value of $C(n)$ gives a false indication of the presence/absence of the near-end signal $x(n)$. Therefore, further detection of the onset of the near-end signal $x(n)$ is carried out at step 408. At step 408, the average onset indicator parameter $\Delta_{avg}(n)$ is compared with the onset detection threshold parameter $\Delta_{st}(n-1)$ and a second threshold value. In accordance with an embodiment of the present invention, the second threshold value is chosen as 0.004. The onset detection threshold parameter has been initialized at step 402 and its calculation and update are explained at steps 412-416. The value of the onset detection threshold parameter that is used to detect the near-end signal $x(n)$ at time instant n is $\Delta_{st}(n-1)$. For example, $\Delta_{avg}(1)$ is compared with $\Delta_{st}(0)$ to detect the onset of the near-end signal $x(n)$. Further, $\Delta_{avg}(2)$ is compared with $\Delta_{st}(1)$, and so on. The onset of the near-end signal $x(n)$ is detected when the average onset indicator parameter $\Delta_{avg}(n)$ is greater than $1.2 \Delta_{st}(n-1)$ and 0.004. When the onset of the near-end signal $x(n)$ is detected, step 410 is performed, as described above.

Figure 4B:
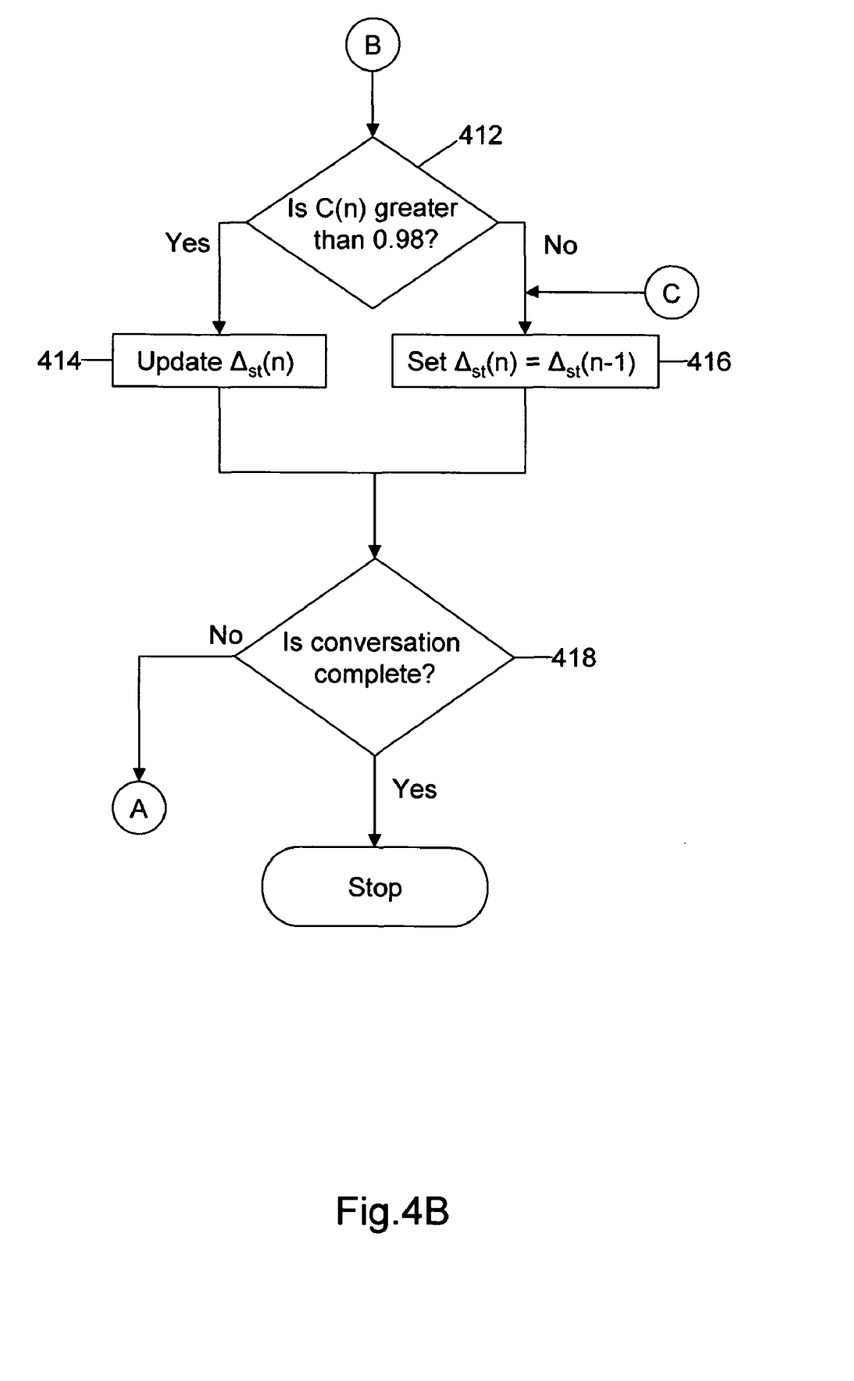

When average onset indicator parameter $\Delta_{avg}(n)$ is less than $1.2 \Delta_{st}(n-1)$ and 0.004, $C(n)$ is compared with a third threshold value at step 412. In accordance with an embodiment of the present invention, the third threshold value is set at 0.98. If $C(n)$ is greater than 0.98, step 414 is performed. At step 414, the onset detection threshold parameter is updated. In accordance with an embodiment of the present invention, the relation used for updating the onset detection threshold parameter is $\Delta_{st}(n)=\Delta_{st}(n-1)+0.002(\Delta(n)-\Delta_{st}(n-1))$, when $\Delta(n)>\Delta_{st}(n-1)$. The $\Delta_{st}(n)$ and $\Delta_{st}(n-1)$ are the values of the onset detection threshold parameter at time instants n and n−1, respectively. Further, $\Delta_{st}(n)=\Delta_{st}(n-1)+0.001(\Delta(n)-\Delta_{st}(n-1))$, when $\Delta(n) \leq \Delta_{avg}(n-1)$. If $C(n)$ is less than or equal to 0.98, step 416 is performed. At step 416, onset detection threshold parameter $\Delta_{st}(n)$ is not updated.

At step 418, it is checked whether the conversation has been completed. If it has, the detection of the onset of the near-end signal is terminated. If the conversation has not been completed, steps 404-416 are repeated at the successive values of time instant n, as shown in the FIGS. 4A and 4B. In case the conversation has been completed, the method is terminated.

Figure 5:
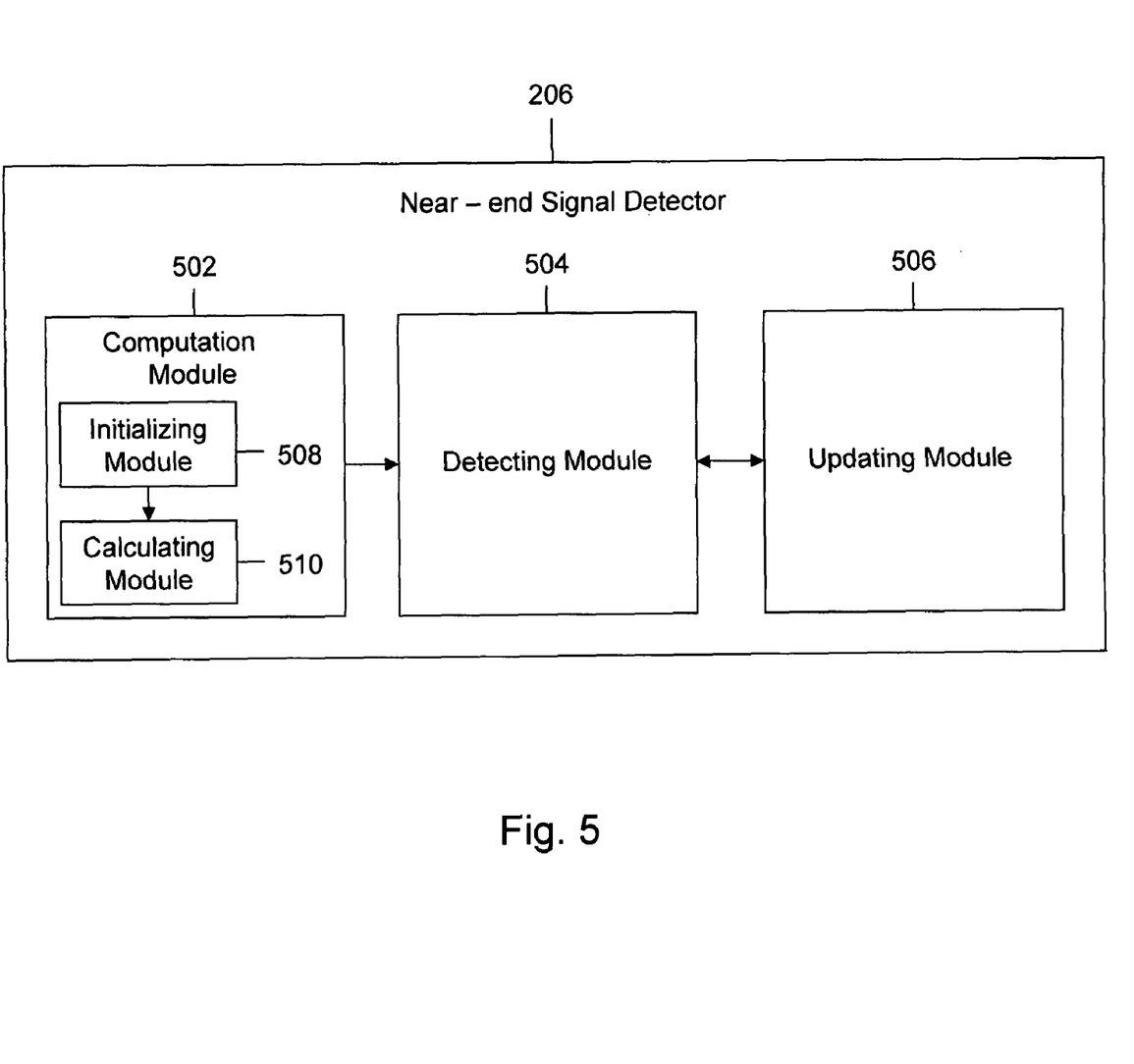
FIG. 5 illustrates a Near-end Signal Detector (NSD) to quickly detect the onset of the near-end signal, in accordance with various embodiments of the present invention.

FIG. 5 illustrates various elements of NSD 206, in accordance with various embodiments of the present invention. NSD 206 detects the onset of the near-end signal during a conversation between the near-end user and the far-end user. Further, NSD 206 includes a computation module 502, a detecting module 504 and an updating module 506.

Computation module 502 is used to compute the onset indicator parameter $\Delta(n)$, as described at step 302 of FIG. 3. Computation module 502 includes an initializing module 508 and a calculating module 510. Initializing module 508 is used to initialize the first set of parameters, as described at step 402 of FIG. 4. Further, calculating module 510 is used to calculate the second set of parameters, as described at step 404 of FIG. 4. The first and second sets of parameters are used to detect the onset of the near-end signal $x(n)$.

Detecting module 504 detects the onset of the near-end signal $x(n)$ at time instant n, based on at least one of: $C(n)$, the onset indicator parameter $\Delta(n)$, the average onset indicator parameter $\Delta_{avg}(n)$, and the onset detection threshold parameter $\Delta_{st}(n-1)$, as described at step 304 of FIG. 3. Detecting module 504 uses the values of the second set of parameters calculated by calculating module 510 and the onset detection threshold parameter $\Delta_{sf}(n-1)$, as updated by updating module 506, to detect the onset of the near-end signal x(n).

Updating module 506 updates the onset detection threshold parameter $\Delta_{sf}(n)$ if the near-end signal x(n) is absent, as described at steps 412, 414 and 416 of FIG. 4. Updating module 506 uses the onset indicator parameter $\Delta(n)$, as calculated by computation module 502 to update the onset detection threshold parameter $\Delta_{sf}(n)$ at time instant n.

Figure 6A:
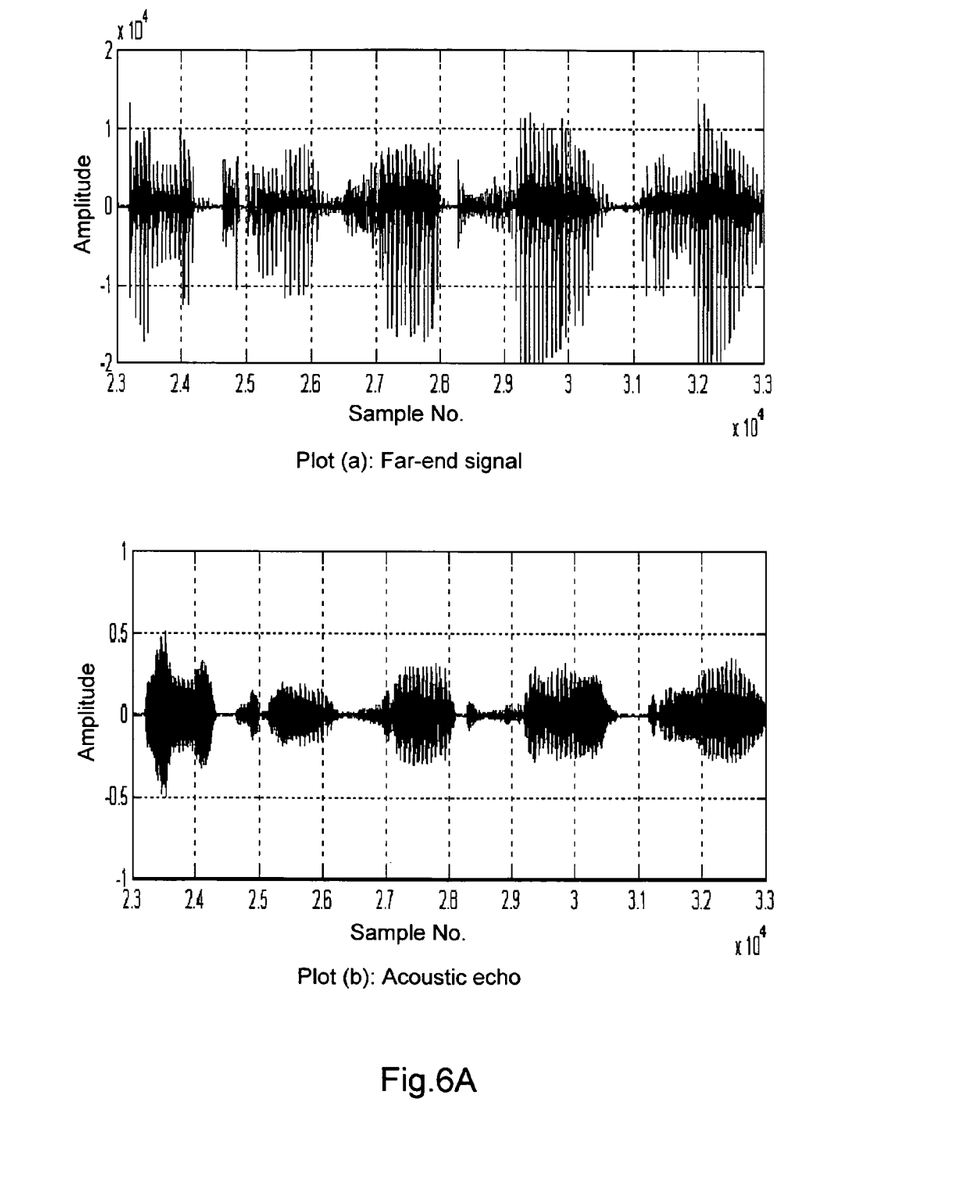
FIG. 6 illustrates a comparison between the timing performance of the NSD of the present invention and the NSD of an Angle Based Method (ABM), in accordance with various embodiments of the present invention.
Figure 6B:
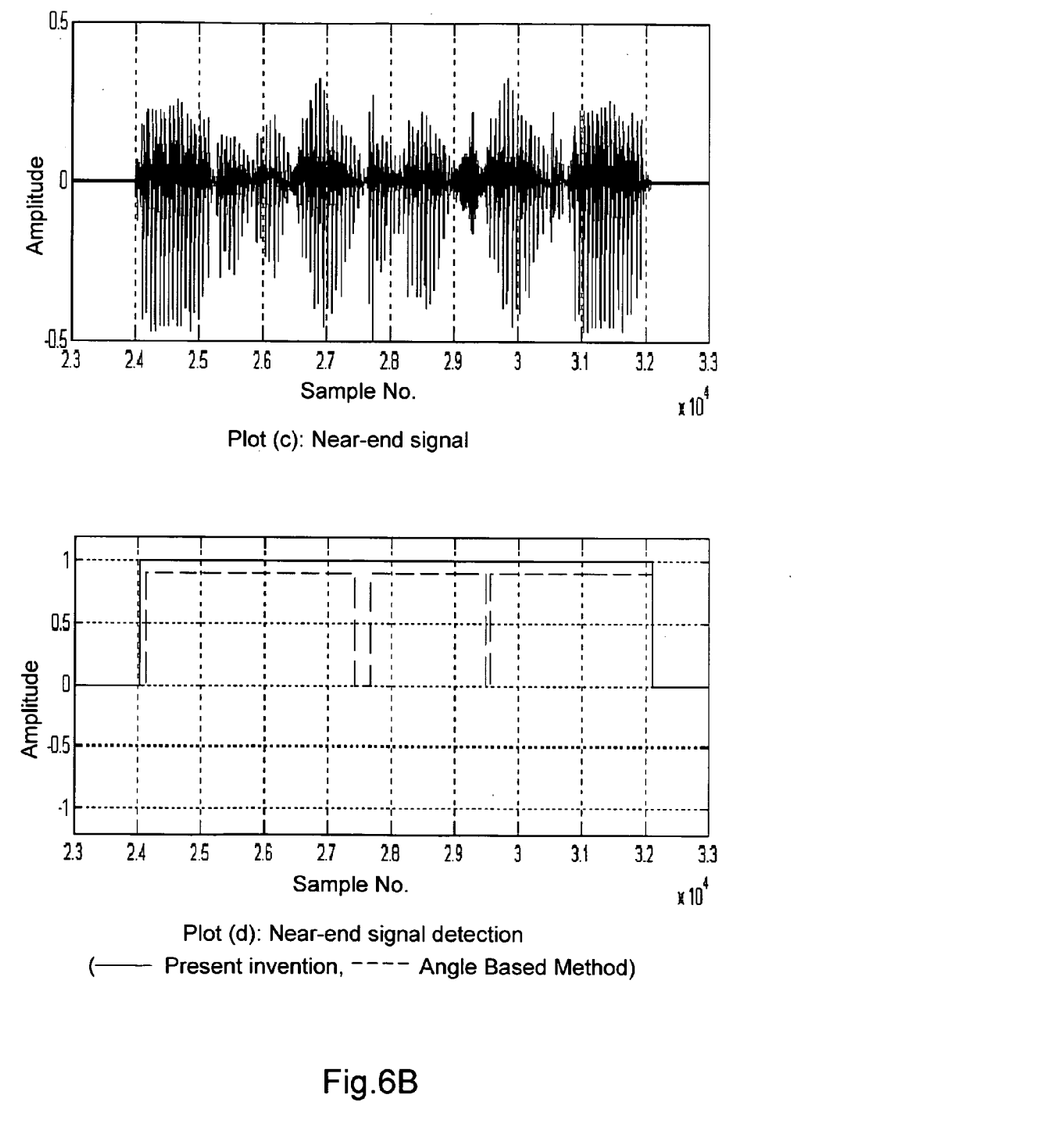

FIGS. 6A and 6B illustrate the simulation results of the comparison of the timing performance of NSD 206 of the present invention with the NSD of the Angle Based Method (ABM), in accordance with various embodiments of the present invention. The plots (a), (b) and (c) of the figures represent the amplitudes of the far-end signal, the acoustic echo and the near-end signal at various time instants, respectively. The amplitudes are calculated at various time instants and can be referred to as samples. Further, plot (d) represents near-end signal detection by using the far-end signal, the acoustic echo and the near-end signal at various time instants. The signals represented in plots (a), (b), and (c) are recorded speech signals. These signals are sampled at 8 kHz. Therefore, the time interval between the two samples of a signal is 0.125 msec.

As illustrated in plots (a) and (b) of FIG. 6A, the duration of the far-end signal and the acoustic echo is 6 seconds within a total of 48000 samples. Further, as illustrated in plot (c) of FIG. 6B, the duration of the near-end signal is 1 second, starting at the fourth second and ending at the start of the fifth second (24001-32000 samples). Plot (d) of FIG. 6B shows a comparison between the timing performance of NSD 206 and the NSD of the ABM. The present invention and the ABM both use an NLMS based adaptive filter 208 with 256 taps, to estimate the acoustic echo. Further, in the ABM, the C(n) is calculated by using a window length of 200. The condition used to detect the onset of the near-end signal is C(n)<0.95.

As illustrated in plot (d), NSD 206 of the present invention detects the onset of the near-end signal x(n) faster than the NSD of ABM. Hence, the timing performance of NSD 206 of the present invention is better than the NSD of ABM.

Figure 7:
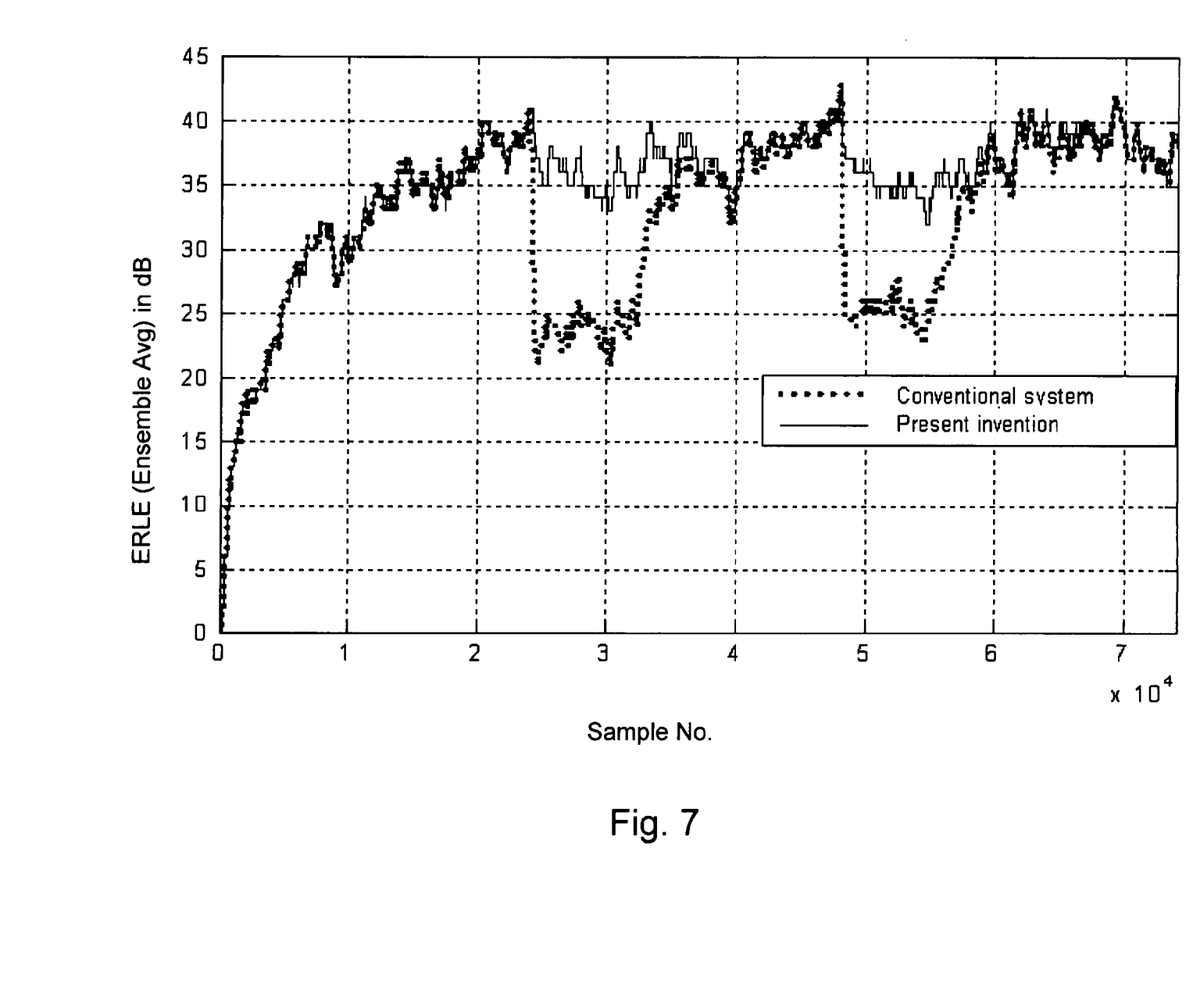
FIG. 7 illustrates a comparison between the impact of the fast detection of onset of near-end signal by the AEC of the present invention and by the AEC of the ABM, in accordance with various embodiments of the present invention.

FIG. 7 illustrates a comparison between the simulation results of the impact of the fast detection of the onset of the near-end signal by AEC 200 of the present invention and by the AEC of the ABM, in accordance with various embodiments of the present invention. The present invention and the ABM both use an NLMS based adaptive filter 208 with 256 taps to estimate the acoustic echo. Further, in the ABM, C(n) is calculated by using a window length of 200 and the condition used to detect the near-end signal is C(n)<0.95. The performance measure used is Echo Return Loss Enhancement (ERLE). ERLE is defined as the ratio of the power in the acoustic echo d(n) to that of the power in the residual echo, denoted by r(n). Ideally, ERLE should not drop in the presence of the near-end signal x(n). However, in a practical scenario, there is a drop in ERLE during the presence of the near-end signal x(n). ERLE is calculated by using the relation $$ERLE = 10\log_{10}\frac{E[d^2(n)]}{E[r^2(n)]}.$$

As mentioned earlier, the residual echo r(n) is calculated by using the relation d(n)−y(n). A window length of 280 is used to estimate the power of the acoustic echo d(n) and the residual echo r(n).

The simulations are performed, as suggested in the ITU standards for AEC G.167. The far-end signal u(n) used in the simulations is a pre-recorded speech signal that is generated by the hands-free mode operation of a Windows based mobile phone. The acoustic echo d(n) used in the simulations is generated by using a practical impulse response of an echo path. The impulse response is generated by the hands-free mode operation of the Windows based mobile phone. The near-end signal x(n) used in the simulations is the speech signal of a speaker. The far-end signal u(n), the acoustic echo d(n) and the near-end signal x(n) are sampled at 8 kHz. The duration of the far-end signal and the acoustic echo is 10 seconds. The near-end signal is added from the start of the fourth second to the end of the fourth second (24001-32000 samples) and again from the start of the seventh second to the end of the seventh second (48001-56000 samples). Ten different realizations of the far-end signal u(n) and the near-end signal x(n) are used in the simulations. ERLE, shown in FIG. 7, is calculated by using the average of results of 10 realizations. In the simulations, the Echo to Noise Ratio (ENR) is maintained at 45 dB. The near-end signal level is −5 dB, the far-end signal level is −5 dB, and the echo level is 0 dB.

As illustrated in FIG. 7, the impact of the fast detection of the near-end signal of AEC 200 of the present invention is better than the AEC of the ABM. In the case of ABM, the ERLE drops by 15 to 20 dB in regions where the near-end signal x(n) is present. However, in the present invention, ERLE drops by less than 5 dB. Therefore, the performance of the present invention is better than that of the ABM by 10-15 dB.

In accordance with various embodiments of the present invention, the NSD provided detects the onset of the near-end signal more quickly, as compared to the NSD of the ABM.

In accordance with various embodiments of the present invention, the impact of detection performance in terms of ERLE of the AEC provided is better than the AEC of the ABM.

In accordance with various embodiments of the present invention, the complexity of the AEC provided is marginally higher than the complexity of the AEC of the ABM.

The system for fast detection of the onset of the near-end signal, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer also comprises a microprocessor that is connected to a communication bus. The computer also includes a memory, which may be a Random Access Memory (RAM) or a Read Only Memory (ROM). Further, the computer system comprises a storage device, which may be a hard-disk drive or a removable storage drive such as a floppy-disk drive, an optical-disk drive, etc. The storage device may also be other similar means for loading computer programs or other instructions into the computer system. Furthermore, the computer system includes a communication unit. This communication unit enables the computer to connect to other databases and the Internet through an Input/Output (I/O) interface, enabling the transfer and reception of data from other databases. The communication unit may include a modem, an Ethernet card, or any other similar device that enables the computer system to connect to databases and networks such as LAN, MAN, WAN and the Internet. The computer system facilitates inputs from a user through an input device that is accessible to the system through an I/O interface.

The computer system executes a set of instructions that are stored in one or more storage elements, to process input data. These storage elements may also hold data or other information, as desired. The storage elements may be in the form of an information source or a physical memory element present in the processing machine.

The programmable instructions may include various commands that instruct the processing machine to perform specific tasks such as the steps that constitute the method of the present invention. The method and systems described can also be implemented by using only software programming or using only hardware, or by a varying combination of the two techniques. The present invention is independent of the programming language used and the operating system of the computers. The instructions for the invention can be written in all programming languages, including but not limited to, 'C', 'C++', 'Visual C++' and 'Visual Basic'. Further, the software may be in the form of a collection of separate programs, a program module with a larger program or a portion of a program module, as in the present invention. The software may also include modular programming in the form of object-oriented programming. Processing of input data by the processing machine may be in response to user commands, the result of previous processing, or a request made by another processing machine. Further, the invention can be implemented in all operating systems and platforms, including but not limited to, 'Unix', 'DOS' and 'Linux'.

The programmable instructions can be stored and transmitted on a computer readable medium such as, but not limited to, a computer disk, tape or memory card. The programmable instructions can also be transmitted by data signals across a carrier wave. Furthermore, the present invention can be embodied in a computer program product comprising a computer readable medium, a product that is capable of implementing the methods and systems given above, or the numerous possible variations thereof.

It will also be evident to any person of reasonable skill in the art that the embodiments of the present invention can be implemented on a Digital Signal Processor (DSP) using its instructions.

While various embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for fast detection of onset of a near-end signal in an echo cancellation system, the near-end signal being a speech signal of a user at a near end of the echo cancellation system, the echo cancellation system generating an estimate of an acoustic echo present at the near end, the near end comprising a microphone, the microphone generating a microphone output signal, the microphone output signal and the estimate of acoustic echo being used to calculate an error signal, the method comprising the steps of:
   a. computing an onset indicator parameter from the error signal; and
   b. detecting onset of the near-end signal based on a cosine value of an angle between the microphone output signal and the estimate of acoustic echo, the onset indicator parameter, an average onset indicator parameter, and an onset detection threshold parameter, the detecting step comprising the steps of:
      i. comparing the cosine value of the angle between the microphone output signal and the estimate of acoustic echo with a first threshold value;
      ii. comparing the average onset indicator parameter with the onset detection threshold parameter and a second threshold value; and
      iii. setting a near-end indicator as one based on the comparisons in step (i) and step (ii).

2. The method according to claim 1, wherein the error signal is calculated using the relation $e(n)=d(n)+x(n)-y(n)$ wherein $e(n)$ is the error signal at time instant n, $d(n)$ is the acoustic echo at time instant n, $x(n)$ is the near-end signal at time instant n and $y(n)$ is the estimate of acoustic echo at time instant n.

3. The method according to claim 1, wherein the step of computing the onset indicator parameter comprises:
   a. initializing a first set of parameters; and
   b. calculating a second set of parameters.

4. The method according to claim 3, wherein the first set of parameters and the second set of parameters are selected from the group consisting of: an average error signal, the onset indicator parameter, the average onset indicator parameter, the onset detection threshold parameter and the cosine value of the angle between the microphone output signal and the estimate of acoustic echo.

5. The method according to claim 4, wherein the initializing the first set of parameters comprises:
   a. initializing the average error signal;
   b. initializing the average onset indicator parameter; and
   c. initializing the onset detection threshold parameter, the onset detection threshold parameter being an adaptive threshold value for detecting the onset of the near-end signal.

6. The method according to claim 4, wherein the calculating the second set of parameters comprises:
   a. calculating the average error signal from the error signal;
   b. calculating the onset indicator parameter from the error signal and the estimate of acoustic echo;
   c. calculating the average onset indicator parameter from the onset indicator parameter; and
   d. calculating the cosine value of the angle between the microphone output signal and the estimate of acoustic echo.

7. The method according to claim 6, wherein the average error signal is calculated using the relation $eavg(n)=eavg(n-1)+0.001(abs(e(n))-eavg(n-1))$ wherein $eavg(n)$ and $eavg(n-1)$ are the average error signals at time instants n and n−1 respectively, $e(n)$ is the error signal at time instant n, and $abs(e(n))$ is the absolute value of the error signal at time instant n.

8. The method according to claim 6, wherein the onset indicator parameter is calculated using the relation $E(n)=e2(n)/(eavg(n)\cdot y(n))$ wherein $\Delta(n)$ is the onset indicator parameter at time instant n, $eavg(n)$ is the average error signal at time instant n, and $y(n)$ is the estimate of acoustic echo at time instant n.

9. The method according to claim 6, wherein the average onset indicator parameter is calculated using the relation $\Delta avg(n)=\Delta avg(n-1)+0.005(\Delta(n)-\Delta avg(n-1))$ when $\Delta(n)<\Delta avg(n-1)$; and $\Delta avg(n)=\Delta avg(n-1)+0.4(\Delta(n)-\Delta avg(n-1))$ when $\Delta(n)>=\Delta avg(n-1)$, wherein $\Delta avg(n-1)$ and $\Delta avg(n)$ are the average onset indicator parameters at time instants n−1 and n respectively, and $\Delta(n)$ is the onset indicator parameter at time instant n.

10. The method according to claim 1, wherein the step of detecting onset of the near-end signal comprises:
   a. comparing the cosine value of the angle between the microphone output signal and the estimate of acoustic echo with the first threshold value;
   b. setting the near-end indicator as one, when the cosine value of the angle between the microphone output signal and the estimate of acoustic echo is less than the first threshold value;
   c. comparing the average onset indicator parameter with the onset detection threshold parameter and the second threshold value, when the cosine value of the angle between the microphone output signal and the estimate of acoustic echo is equal to or greater than the first threshold value; and
   d. setting the near-end indicator as one, when the average onset indicator parameter is greater than the onset detection threshold parameter and the second threshold value.

11. The method according to claim 1, wherein the step of detecting onset of the near-end signal comprises:
   a. comparing the cosine value of the angle between the microphone output signal and the estimate of acoustic echo with 0.95;
   b. setting the near-end indicator as one, when the cosine value of the angle between the microphone output signal and the estimate of acoustic echo is less than 0.95;
   c. comparing the average onset indicator parameter with the onset detection threshold parameter and 0.004, when the cosine value of the angle between the microphone output signal and the estimate of acoustic echo is equal to or greater than 0.95; and
   d. setting the near-end indicator as one, when the average onset indicator parameter is greater than both 1.2 times the onset detection threshold parameter and 0.004.

12. The method according to claim 10, wherein the setting the near-end indicator as one comprises:
   a. freezing the coefficients of an adaptive filter, wherein the adaptive filter is present at the near end of the echo cancellation system; and
   b. passing the error signal to the output of the echo cancellation system.

13. The method according to claim 1 further comprising the step of updating the onset detection threshold parameter when the cosine value of the angle between the microphone output signal and the estimate of acoustic echo is greater than a third threshold value.

14. The method according to claim 13, wherein the third threshold value is 0.98.

15. The method according to claim 13, wherein the step of updating the onset detection threshold parameter is performed using the relation $\Delta st(n)=\Delta st(n-1)+0.002(\Delta(n)-\Delta st(n-1))$ when $\Delta(n)>\Delta st(n-1)$; and $\Delta st(n)=\Delta st(n-1)+0.001(\Delta(n)-\Delta st(n-1))$ when $\Delta(n) \Delta avg(n-1)$ wherein $\Delta st(n)$ and $\Delta st(n-1)$ are the onset detection threshold parameters at time instants $n-1$ and $n$ respectively, and $\Delta(n)$ is the onset indicator parameter at time instant n.

16. The method according to claim 1, wherein the method is carried out by one or more computer programs.

17. A method for fast detection of onset of a near-end signal in an echo cancellation system, the near-end signal being a speech signal of a user at a near end of the echo cancellation system, the echo cancellation system generating an estimate of an acoustic echo present at the near end, the near end comprising a microphone, the microphone generating a microphone output signal, the microphone output signal and the estimate of acoustic echo being used to calculate an error signal, the method comprising the steps of:
   a. calculating an onset indicator parameter and an average error signal using the error signal;
   b. calculating an average onset indicator parameter from the onset indicator parameter;
   c. comparing a cosine value of an angle between the microphone output signal and the estimate of acoustic echo with a first threshold value;
   d. setting a near-end indicator as one, when the cosine value of the angle between the microphone output signal and the estimate of acoustic echo is less than the first threshold value;
   e. comparing the average onset indicator parameter with an onset detection threshold parameter and a second threshold value when the cosine value of the angle between the microphone output signal and the estimate of acoustic echo is equal to or greater than the first threshold value; and
   f. setting the near-end indicator as one, when the average onset indicator parameter is greater than the onset detection threshold parameter and the second threshold value.

18. The method according to claim 17 further comprising the step of updating the onset detection threshold parameter when the cosine value of the angle between the microphone output signal and the estimate of acoustic echo is greater than a third threshold value.

19. The method according to claim 17, wherein the method is carried out by one or more computer programs.

20. A system for fast detection of onset of a near-end signal in an echo cancellation system, the near-end signal being a speech signal of a user at a near end, the system comprising:
   a. a computation module, the computation module configured for computing an onset indicator parameter; and
   b. a detecting module, the detecting module configured for:
      i. detecting onset of the near-end signal based on a cosine value of an angle between the microphone output signal and an estimate of acoustic echo, the onset indicator parameter, an average onset indicator parameter, and an onset detection threshold parameter;
      ii. comparing the cosine value of the angle between the microphone output signal and the estimate of acoustic echo with a first threshold value;
      iii. comparing the average onset indicator parameter with the onset detection threshold parameter and a second threshold value; and
      iv. setting a near-end indicator as one based on the comparisons in step (ii) and step (iii).

21. The system according to claim 20, wherein the computation module comprises:
   a. an initializing module, the initializing module configured for initializing a first set of parameters; and
   b. a calculating module, the calculating module configured for calculating a second set of parameters.

22. The system according to claim 20 further comprising an updating module, the updating module configured for updating the onset detection threshold parameter, the onset detection threshold parameter being an adaptive threshold value for detecting onset of the near-end signal.

* * * * *